United States Patent Office 2,805,202
Patented Sept. 3, 1957

2,805,202
STICK CORROSION INHIBITORS

Charles C. Nathan, Bellaire, Tex., assignor to The Texas Company, New York, N. Y., a corporation of Delaware No Drawing. Application September 30, 1955,
Serial No. 537,905

10 Claims. (Cl. 252—8.55)

The present invention relates to inhibiting corrosion in oil well tubing, and is particularly concerned with an improved stick type of inhibitor which can be dropped into oil well tubing.

In my copending application Serial No. 371,167, filed July 29, 1953, of which the present application is a continuation-in-part, there is disclosed a method for inhibiting metal bodies against corrosion by maintaining in contact with such a body at least one symmetrical thiourea compound corresponding to the formula $$\begin{array}{c} H \quad S \quad H \\ | \quad \| \quad | \\ R-N-C-N-R \end{array}$$

wherein R is an aliphatic radical having from 5 to 8 carbon atoms such as an unsubstituted radical or a mono aryl substituted radical, for example n-hexyl, β-phenyl ethyl, or α-methyl benzyl.

Compounds of the type mentioned above which have been employed successfully in my novel method are:
1. s-Di-n hexyl thiourea (melting point 40° C):

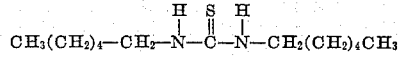

2. s-Di β-phenyl ethyl thiourea (melting point 84° C.):

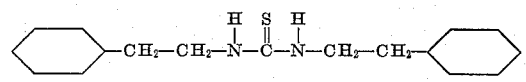

3. s-Di-α-methyl benzyl thiourea (melting point 163° C.):

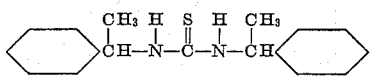

Efforts were made to compound a satisfactory stick inhibitor by mixing such a thiourea with paraffin waxes of the type conventionally employed as binders in such sticks. It was found, however, that such mixtures are unsatisfactory because they have no mechanical strength and will not hold together. One possible explanation of this failure is that paraffin wax is a non-polar material while the thiourea is a polar material.

After considerable experimentation I have found, surprisingly, that a satisfactorily coherent stick inhibitor can be made up by mixing the thiourea compound with amorphous synthetic wax. One such wax comprises at least one high molecular weight n-primary aliphatic amide having from 6 to 18 carbon atoms. Another comprises at least one high molecular weight polyethylene glycol fatty acid ester wherein the fatty acid group has from 12 to 18 carbon atoms, said ester having a high molecular weight between 4000 and 6000. I ascribe my success with such a mixture to the fact that the synthetic waxes are amorphous materials having polar groups such as hydroxyl, ether, and amide groups which are characterized by their ability to solubilize the thiourea compound thus being compatible therewith.

In preparing the novel stick inhibitor compositions of this invention, the synthetic wax-and-thiourea mixture is heated to a temperature above the melting point of the mixture, after which they are thoroughly mixed together, and with any other ingredients needed. The mixture is then allowed to cool as rapidly as possible and the synthetic wax to solidify. Rapid cooling effects the formation of fine crystals and prevents the settling of the weighting material, e. g., barytes or other high density materials such as iron oxide.

Any of several different n-primary aliphatic amide synthetic waxes may be used for the present invention, several of which are described in the following table, percentages being by weight:

|  | Synthetic Wax | | |
| --- | --- | --- | --- |
|  | A | B | C |
| Hexadecanoic acid amide ............... percent.. | 90 | 6 | 25 |
| Octadecanoic acid amide ............... do .... | 6 | 93 | 90 |
| Octadecenoic acid amide ............... do .... | 4 | 1 | 5 |
| Melting point, ° C ............... | 97 | 100 | 98 |

The above amides usually contain a small amount of unreacted fatty acid, such as 5%, which does not adversely affect the stick inhibitor.

A synthetic wax composed of a polyethylene glycol stearate has also been used successfully which is a hard, tough, tan wax having a molecular weight of about 6000, a melting point of 140 to 143° C., a flash point of 285° C., and a specific gravity of 0.97 at 20° C. compared to water at the same temperature.

In preparing stick inhibitors in accordance with the invention the proportion of the synthetic wax binder required is relatively small, usually ranging from 1 to 15% by weight based on the thiourea and any other ingredients.

While from the corrosion prevention standpoint all that is required is a two component mixture of the proper thiourea with synthetic wax, it is sometimes necessary to incorporate in the stick other ingredients such as weighting materials which will impart a high enough specific gravity so that the stick will sink in well fluid. A commonly used weighting material is barytes.

Example I

A stick inhibitor was made up by heating to 110° C. 18 grams of amide type synthetic wax A mixed with 360 grams of thiourea No. 2, and 360 grams of barytes. Upon solidification of the melted synthetic wax and thiourea the resulting solid stick was found to be strongly bonded together. It was then successfully introduced into an oil well.

Example II

A stick inhibitor was made up by heating to 110° C. a mixture of 7.5 grams of amide type synthetic wax A, 7.5 grams of amide type synthetic wax B, 300 grams of thiourea No. 2, and 300 grams of barytes. The synthetic wax and thiourea melted and were then allowed to solidify. A strongly bonded stick was obtained. It was then successfully introduced into an oil well.

Example III

A stick inhibitor was made up by heating to 110° C. a mixture of 10 grams of the synthetic wax composed of a polyethylene glycol monostearate having a molecular weight of 6000, as described above, and 100 grams of thiourea No. 2. The mixture was then cooled and solidified to form a strongly bonded stick having a specific gravity of 1.05.

Example IV

A stick inhibitor was made up by heating to 110° C.

a mixture of 10 grams of the synthetic wax composed of a polyethylene glycol monostearate having a molecular weight of 6000, of the type described above, 100 grams of thiourea No. 2, and 110 grams of barytes. Upon cooling the mixture the synthetic wax and thiourea solidified and a strongly bonded stick inhibitor resulted having a specific gravity of 1.4, a softening point of 80° C., and a melting point of 90° C.

Obviously, many modifications and variations of the invention, as hereinbefore set forth, may be made without departing from the spirit and scope thereof, and therefore only such limitations should be imposed as are indicated in the appended claims.

I claim:

1. A bonded solid corrosion inhibiting composition of matter characterized by high mechanical strength consisting essentially of at least one thiourea compound corresponding to the formula

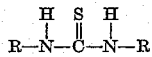

wherein R is an aliphatic radical having from 5 to 8 carbon atoms, and mixed therewith as a binder therefor a solid amorphous synthetic wax selected from the group consisting of a high molecular weight polyethylene glycol fatty acid ester wherein the fatty acid group has from 12 to 18 carbon atoms, said ester having a molecular weight between 4000 and 6000, and an N-primary aliphatic amide having from 6 to 18 carbon atoms in the aliphatic acid radical.

2. A composition of matter in accordance with claim 1 wherein said thiourea is s-di-n hexyl thiourea.

3. A composition of matter in accordance with claim 1 wherein said thiourea is s-di-β-phenyl ethyl thiourea.

4. A composition of matter in accordance with claim 1 wherein said thiourea is s-di-α-methyl benzyl thiourea.

5. A composition of matter in accordance with claim 1 wherein said synthetic wax consists essentially of at least one high molecular weight polyethylene glycol fatty acid ester wherein the fatty acid group has from 12 to 18 carbon atoms, said ester having a molecular weight between 4000 and 6000.

6. In a method for inhibiting against corrosion a steel tube in a well wherein petroleum fluid associated with a corrosive water solution is flowing, by introducing into said solution at least one thiourea compound corresponding to the formula

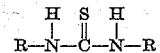

wherein R is an aliphatic radical having from 5 to 8 carbon atoms, the improvement comprising dropping through said tube a bonded solid body consisting essentially of said thiourea compound bonded with an N-primary aliphatic amide having from 6 to 18 carbon atoms in the aliphatic acid radical.

7. A solid corrosion inhibiting composition consisting essentially of at least one thiourea corresponding to the formula:

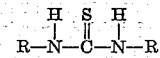

in which R is an aliphatic radical having from 5 to 8 carbon atoms and mixed therewith as a binder an N-primary aliphatic amide having from 6 to 18 carbon atoms in the aliphatic acid radical.

8. A composition according to claim 7 in which said binder consists of hexadecanoic acid amide.

9. A composition according to claim 7 in which said binder consists of octadecanoic acid amide.

10. A composition according to claim 7 in which said binder consits of octadecenoic acid amide.

References Cited in the file of this patent

UNITED STATES PATENTS

| | | |
|---|---|---|
| 2,599,385 | Gross et al. | June 3, 1952 |
| 2,602,779 | Moyer et al. | July 8, 1952 |
| 2,728,727 | Marsh | Dec. 27, 1955 |
| 2,698,295 | Cardwell et al. | Dec. 28, 1954 |